United States Patent
Shin et al.

(10) Patent No.: US 10,318,127 B2
(45) Date of Patent: Jun. 11, 2019

(54) INTERFACE PROVIDING SYSTEMS AND METHODS FOR ENABLING EFFICIENT SCREEN CONTROL

(71) Applicant: LINE Corporation, Tokyo (JP)

(72) Inventors: Jieun Shin, Seongnam-si (KR); Seungjun Lee, Seongnam-si (KR)

(73) Assignees: LINE Corporation, Tokyo (JP); NAVER Corporation, Seongnam-si (KR)

( * ) Notice: Subject to any disclaimer, the term of this patent is extended or adjusted under 35 U.S.C. 154(b) by 155 days.

(21) Appl. No.: 14/837,681

(22) Filed: Aug. 27, 2015

(65) Prior Publication Data

US 2016/0266775 A1 Sep. 15, 2016

(30) Foreign Application Priority Data

Mar. 12, 2015 (KR) .......................... 10-2015-0034378

(51) Int. Cl.
*G06F 3/0485* (2013.01)
*G06F 3/0488* (2013.01)
(Continued)

(52) U.S. Cl.
CPC ....... *G06F 3/04845* (2013.01); *G01C 21/367* (2013.01); *G06F 3/04855* (2013.01); *G06F 3/04883* (2013.01)

(58) Field of Classification Search
None
See application file for complete search history.

(56) References Cited

U.S. PATENT DOCUMENTS

| | | | | | |
|---|---|---|---|---|---|
| 6,069,626 | A | * | 5/2000 | Cline | G06F 3/04855 345/629 |
| 6,922,816 | B1 | * | 7/2005 | Amin | G06F 3/04847 715/732 |

(Continued)

FOREIGN PATENT DOCUMENTS

| | | |
|---|---|---|
| JP | H07-200880 A | 8/1995 |
| JP | H10-312391 A | 11/1998 |

(Continued)

OTHER PUBLICATIONS

Fletcher Dunn and Ian Parberry, 3D Math Primer for Graphics and Game Development, 2nd Edition, Nov. 2, 2011, 3 pages.*

(Continued)

*Primary Examiner* — Yongjia Pan
(74) *Attorney, Agent, or Firm* — Harness, Dickey & Pierce, P.L.C.

(57) ABSTRACT

In one example embodiment, an interface providing method in an interface providing system implemented with a computer including a touch screen, includes displaying, by a processor, contents on the touch screen, and activating and displaying, by the processor, a pointer object at a position corresponding to a position of a touch on the touch screen. The method further includes moving, by the processor, the pointer object as a position of the touch moves in a state where the touch is maintained, controlling, by the processor, a rotation of contents displayed on the touch screen based on the moving of the pointer object, and deactivating, by the processor, the pointer object and the displaying of the pointer object, when the touch is terminated.

16 Claims, 5 Drawing Sheets

(51) Int. Cl.
*G06F 3/0484* (2013.01)
*G01C 21/36* (2006.01)

(56) References Cited

U.S. PATENT DOCUMENTS

| | | | | |
|---|---|---|---|---|
| 8,239,784 B2* | 8/2012 | Hotelling | ............. | G06F 3/0418 345/173 |
| 2007/0206030 A1* | 9/2007 | Lukis | ............. | G06T 19/20 345/653 |
| 2008/0024444 A1* | 1/2008 | Abe | ............. | G06F 3/0485 345/157 |
| 2008/0034289 A1* | 2/2008 | Doepke | ............. | G06F 3/04812 715/700 |
| 2008/0129686 A1* | 6/2008 | Han | ............. | G06F 3/0482 345/156 |
| 2008/0140718 A1* | 6/2008 | Evans | ............. | G06F 17/30241 |
| 2008/0165141 A1* | 7/2008 | Christie | ............. | G06F 3/044 345/173 |
| 2008/0204476 A1* | 8/2008 | Montague | ............. | G06F 3/04845 345/661 |
| 2009/0079700 A1* | 3/2009 | Abernathy | ............. | G06F 3/04845 345/173 |
| 2010/0058228 A1* | 3/2010 | Park | ............. | G06F 3/04847 715/786 |
| 2010/0079493 A1 | 4/2010 | Tse et al. | | |
| 2010/0277419 A1* | 11/2010 | Ganey | ............. | G06F 3/0481 345/173 |
| 2010/0295799 A1* | 11/2010 | Nicholson | ............. | G06F 1/1626 345/173 |
| 2011/0173533 A1* | 7/2011 | Liu | ............. | G06F 3/0488 715/702 |
| 2011/0187748 A1* | 8/2011 | Lee | ............. | G09G 5/00 345/649 |
| 2012/0146927 A1* | 6/2012 | Chang | ............. | G06F 3/04883 345/173 |
| 2013/0212541 A1* | 8/2013 | Dolenc | ............. | G06F 3/017 715/863 |
| 2013/0260893 A1 | 10/2013 | Shin et al. | | |
| 2013/0275042 A1* | 10/2013 | Park | ............. | G06T 3/60 701/461 |
| 2013/0332543 A1 | 12/2013 | Shin et al. | | |
| 2013/0339899 A1* | 12/2013 | Hong | ............. | G06F 3/04855 715/786 |
| 2014/0019540 A1 | 1/2014 | Shin et al. | | |
| 2014/0059489 A1* | 2/2014 | Klask | ............. | G06F 3/017 715/825 |
| 2014/0096092 A1* | 4/2014 | Johnson | ............. | G06F 3/0481 715/863 |
| 2014/0375635 A1* | 12/2014 | Johnson | ............. | G06T 17/20 345/420 |

FOREIGN PATENT DOCUMENTS

| | | | |
|---|---|---|---|
| JP | 2004-078693 A | 3/2004 | |
| JP | 2004-094678 A | 3/2004 | |
| JP | 2014-164742 A | 9/2014 | |
| JP | 2015-95823 A | 5/2015 | |
| KR | 10-1260016 B1 | 5/2013 | |
| KR | 20140119439 A | 10/2014 | |
| KR | PCT/KR2014/010167 B1 | 7/2015 | |
| WO | WO-2013-065214 A1 | 5/2013 | |

OTHER PUBLICATIONS

Ruohan Qian, Weihai Li, Nenghai Yu, and Bin Liu, High Precision Image Rotation Angle Estimation with Periodicity of Pixel Variance, 2013, 6 pages.*
Smooth rotation / movement ?, Oct. 8, 2011, 4 pages.*
Gregory M. Nielson, Smooth Interpolation of Orientations, 1993, 22 pages.*
Office Action for corresponding Japanese Application No. 2015-095823 dated Jun. 29, 2016.
Jason Gregory, "Linear interpolation of point and vector," Game Engine Architecture, Softbank Creative Corporation, Japan, Dec. 1, 2010, First Edition, p. 149.
Office Action for corresponding Korean Application No. 10-2015-0034378 dated Feb. 3, 2016.
Office Action for corresponding Japanese Patent Application No. 2016-153375 dated Jan. 22, 2019.
Kita Kagaku et al., "139 Iron Rules to make a good Android application", Japan, Jul. 15, 2014, First Edition, p. 330-335.
Jason Gregory, "Game Engine Architecture", Softbank Creative Corporation, Japan, Dec. 1, 2010, First Edition, p. 174-176.

* cited by examiner

INTERFACE PROVIDING SYSTEMS AND METHODS FOR ENABLING EFFICIENT SCREEN CONTROL

CROSS-REFERENCE TO RELATED APPLICATIONS

A claim for priority under 35 U.S.C. § 119 is made to Korean Patent Application No. 10-2015-0034378 filed Mar. 12, 2015, in the Korean Intellectual Property Office, the entire contents of which are hereby incorporated by reference.

BACKGROUND

1. Field

Example embodiments of inventive concepts described herein relate to technologies for providing an efficient interface for screen control, and more particularly, to an interface providing system for controlling rotation of contents with only one finger of a user and/or a method of controlling rotation of contents with only one finger of a user.

2. Description of Related Art

Recently, with the spread of smartphones and the development of mobile communication networks, users may freely receive a variety of information and services without restrictions in time and space.

A location based service among the services users receive, provides information suitable for various purposes to the users by being applied to notification of a bus/subway arrival time, navigation, and the like. To provide the location based service to a user, there is a need for a process of obtaining accurate location information of the user or an object. This location information is generally obtained according to a global positioning system (GPS) signal. However, when the location information is obtained according to the GPS signal, it is difficult to measure a location of a real user or object in a shadow area of the GPS signal, such as an area between buildings, or an area, such as the inside of a building, which is difficult to receive the GPS signal.

Also, when a map service including this location information is provided, there are interfaces which move or rotate a map displayed on a screen. Conventionally, a user touches and drags the screen which displays the map to move the map and rotates the map on the screen through a multi-touch using his or her two fingers.

SUMMARY

Example embodiments of inventive concepts provide an interface providing system and/or method for providing a user interface of a new type, which may rotate a screen through a pointer object controlled by a slide type.

Example embodiments of inventive concepts provide an interface providing system and/or a method for controlling Z-axis rotation of contents according to a movement in a first direction (e.g., a transverse direction) of a touch in a state where a pointer object is activated and controlling X-axis rotation of the contents according to a movement in a second direction (e.g., a longitudinal direction) of the touch.

In one example embodiment, an interface providing method in an interface providing system implemented with a computer including a touch screen, includes displaying, by a processor, contents on the touch screen, and activating and displaying, by the processor, a pointer object at a position corresponding to a position of a touch on the touch screen. The method further includes moving, by the processor, the pointer object as a position of the touch moves in a state where the touch is maintained, controlling, by the processor, a rotation of contents displayed on the touch screen based on the moving of the pointer object, and deactivating, by the processor, the pointer object and the displaying of the pointer object, when the touch is terminated.

In yet another example embodiment, the activating and displaying the pointer object includes further displaying a scroll bar object, for guiding a movement of the pointer object. The moving moves the pointer object along the scroll bar object.

In yet another example embodiment, the controlling the rotation of the contents displayed on the touch screen includes moving the pointer object according to a variance of a first direction of movement of the touch or a variance of an opposite direction of the first direction and rotating the contents relative to a Z axis of a 3-dimensional (3D) coordinate system, and rotating the contents relative to an X axis of the 3D coordinate system according to a variance of a second direction of movement of the touch or a variance of an opposite direction of the second direction.

In yet another example embodiment, the moving the pointer object moves the pointer object along an axis corresponding to the first direction, and an axis corresponding to the first direction is perpendicular to an axis corresponding to the second direction.

In yet another example embodiment, the rotation of the contents according to the variance of the second direction is limited to an angle range of −90 degrees to 90 degrees.

In yet another example embodiment, the controlling the rotation of the contents displayed on the touch screen includes calculating an angle of rotation relative to an axis of a 3-dimensional (3D) coordinate system according to a value in which a pixel variance of a direction of movement of the touch is changed to a density-independent pixels (DP) variance and a weight value.

In yet another example embodiment, the controlling the rotation of the contents displayed on the touch screen includes when a current first rotation angle of the contents is changed to a second rotation angle calculated according to a movement of the touch to display the contents, determining a rotation angle of the contents in a next frame using a third rotation angle calculated per frame according to an interpolation method to which the first rotation angle, the second rotation angle, and a smoothing factor are applied.

In yet another example embodiment, the contents include a map screen provided by a map service.

In one example embodiment, a non-transitory computer-readable medium stores computer-readable instructions, which when executed by a processor, cause the processor to implement an interface providing method in an interface providing system implemented with a computer including a touch screen. The method includes displaying, by a processor, contents on the touch screen, and activating and displaying, by the processor, a pointer object at a position corresponding to a position of a touch on the touch screen. The method further includes moving, by the processor, the pointer object as a position of the touch moves in a state where the touch is maintained, controlling, by the processor, a rotation of contents displayed on the touch screen based on the moving of the pointer object, and deactivating, by the processor, the pointer object and the displaying of the pointer object, when the touch is terminated.

In one example embodiment, an interface providing system implemented with a computer including a touch screen, includes a processor. The processor is configured to execute computer-readable instructions to, display contents on the touch screen, activate and display a pointer object at a position corresponding to a position of a touch on the touch screen, move the pointer object as a position of the touch moves in a state where the touch is maintained, control a rotation of contents displayed on the touch screen based on the movement of the pointer object, and deactivate the pointer object and the displaying of the pointer object, when the touch is terminated.

In yet another example embodiment, the processor is configured to display a scroll bar object, for guiding a movement of the pointer object. The processor is configured to move the pointer object along the scroll bar object.

In yet another example embodiment, the controller is configured to, move the pointer object according to a variance of a first direction of movement of the touch or a variance of an opposite direction of the first direction and rotates the contents relative to a Z axis of a 3-dimensional (3D) coordinate system, and rotate the contents relative to an X axis of the 3D coordinate system according to a variance of a second direction of movement of the touch or a variance of an opposite direction of the second direction.

In yet another example embodiment, the processor is configured to calculate an angle of rotation relative to an axis of a 3-dimensional (3D) coordinate system according to a value in which a pixel variance of a movement of the touch is changed to a density-independent pixels (DP) variance and a weight value.

In yet another example embodiment, when a current first rotation angle of the contents is changed to a second rotation angle calculated according to a movement of the touch to display the contents, the processor is configured to determine a rotation angle of the contents in a next frame using a third rotation angle calculated per frame according to an interpolation method to which the first rotation angle, the second rotation angle, and a smoothing factor are applied.

In yet another example embodiment, the contents include a map screen for a map service.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Figure 1:
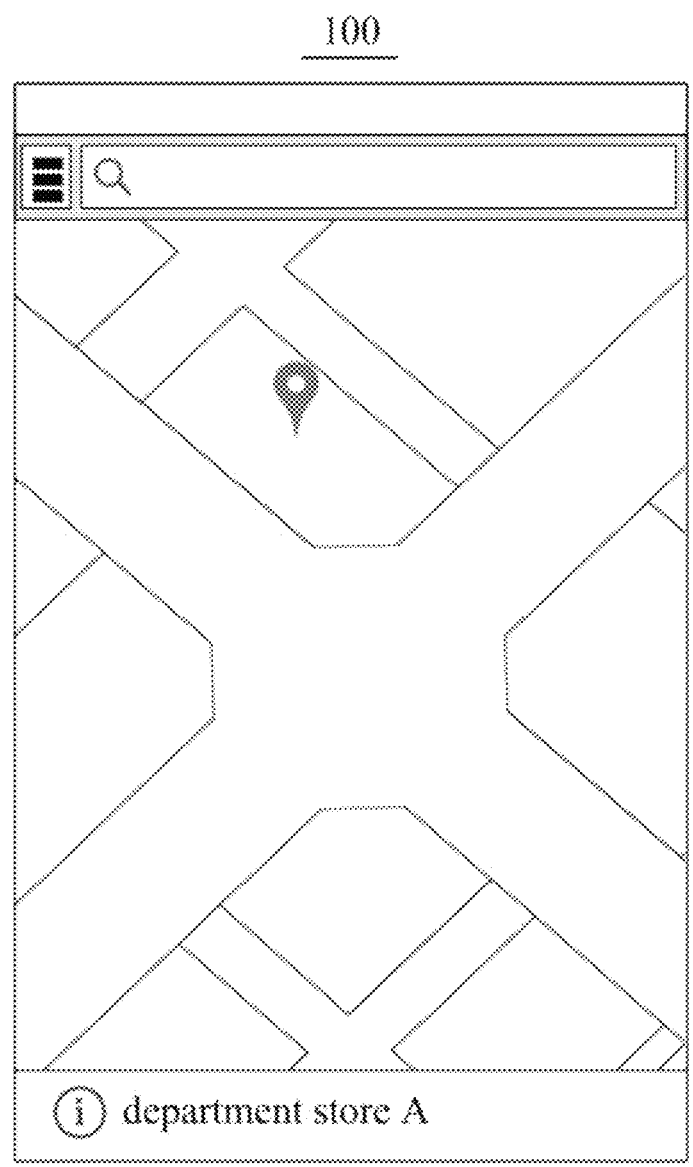
FIG. 1 illustrates a screen for displaying map contents according to an example embodiment.

Example embodiments will be described in detail with reference to the accompanying drawings. Inventive concepts, however, may be embodied in various different forms, and should not be construed as being limited only to the illustrated example embodiments. Rather, these example embodiments are provided so that this disclosure will be thorough and complete, and will fully convey the concept of inventive concepts to those skilled in the art.

Accordingly, known processes, elements, and techniques are not described with respect to some of the example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions and/or sections, these elements, components, regions and/or sections should not be limited by these terms. These terms are only used to distinguish one element, component, region or section from another region, layer or section. Thus, a first element, component, region or section discussed below could be termed a second element, component, region or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary", if and when used, is intended to refer to an example or illustration.

It will be understood that when an element is referred to as being "on", "connected to", "coupled to", or "adjacent to" another element or layer, it can be directly on, connected, coupled, or adjacent to the other element, or intervening elements may be present. In contrast, when an element is referred to as being "directly on," "directly connected to", "directly coupled to", or "immediately adjacent to" another element, there are no intervening elements present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for example embodiments of inventive concepts with reference to the accompanying drawings.

Example embodiments of inventive concepts relate to an interface providing system and/or method for providing a user interface of a new type for rotation of a screen.

FIG. 1 illustrates a screen for displaying map contents according to an example embodiment. A screen 100 displays an example of displaying contents on a user terminal including a touch screen. Contents for rotation may not be limited to map contents. For example, photo contents may be used as the contents for rotation. Specific image contents selected among a plurality of image contents displayed on a screen may be used as the contents for rotation.

The user terminal may be a computer device including a touch screen and may include a function for communicating with a server to receive a map service. Examples of a user terminal include, but is not limited to, a mobile device, a tablet, a personal computer, a laptop computer, a personal digital assistant (PDA), etc.

Figure 2:
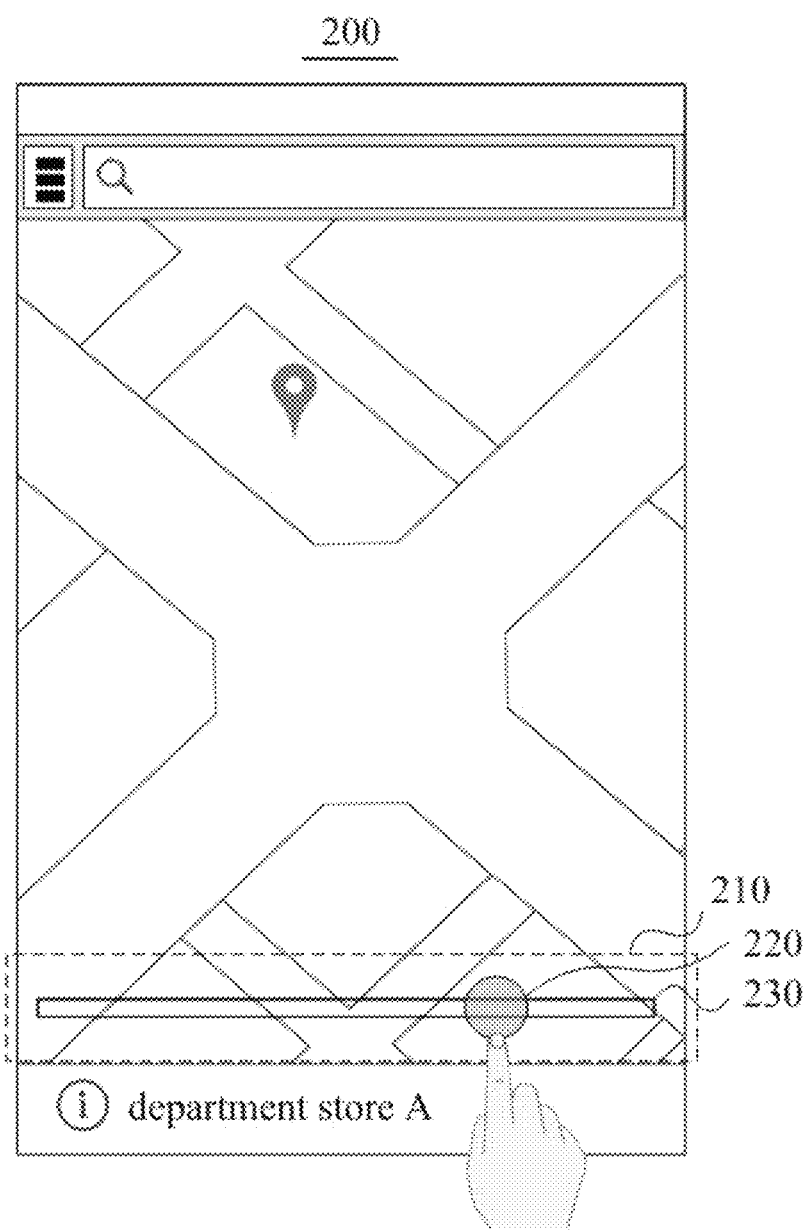
FIG. 2 illustrates a screen for displaying a pointer object and a scroll bar object based on a touch according to an example embodiment.

FIG. 2 illustrates a screen for displaying a pointer object and a scroll bar object based on a touch according to an example embodiment. A screen 200 displays an example in which a pointer object 220 is activated and displayed on a position corresponding to a position of a touch as a user touches a predetermined (and/or alternatively, desired) region of a touch screen such as a region indicated by a dotted box 210. In this case, a scroll bar object 230 for guiding movement of this pointer object 220 may be further activated and displayed. The pointer object 220 and the scroll bar object 230 may be activated while the touch of the user is maintained. When the touch is released, the pointer object 220 and the scroll bar object 230 may be inactivated and the displaying of the pointer object 220 and the scroll bar object 230 may be terminated.

Figure 3:
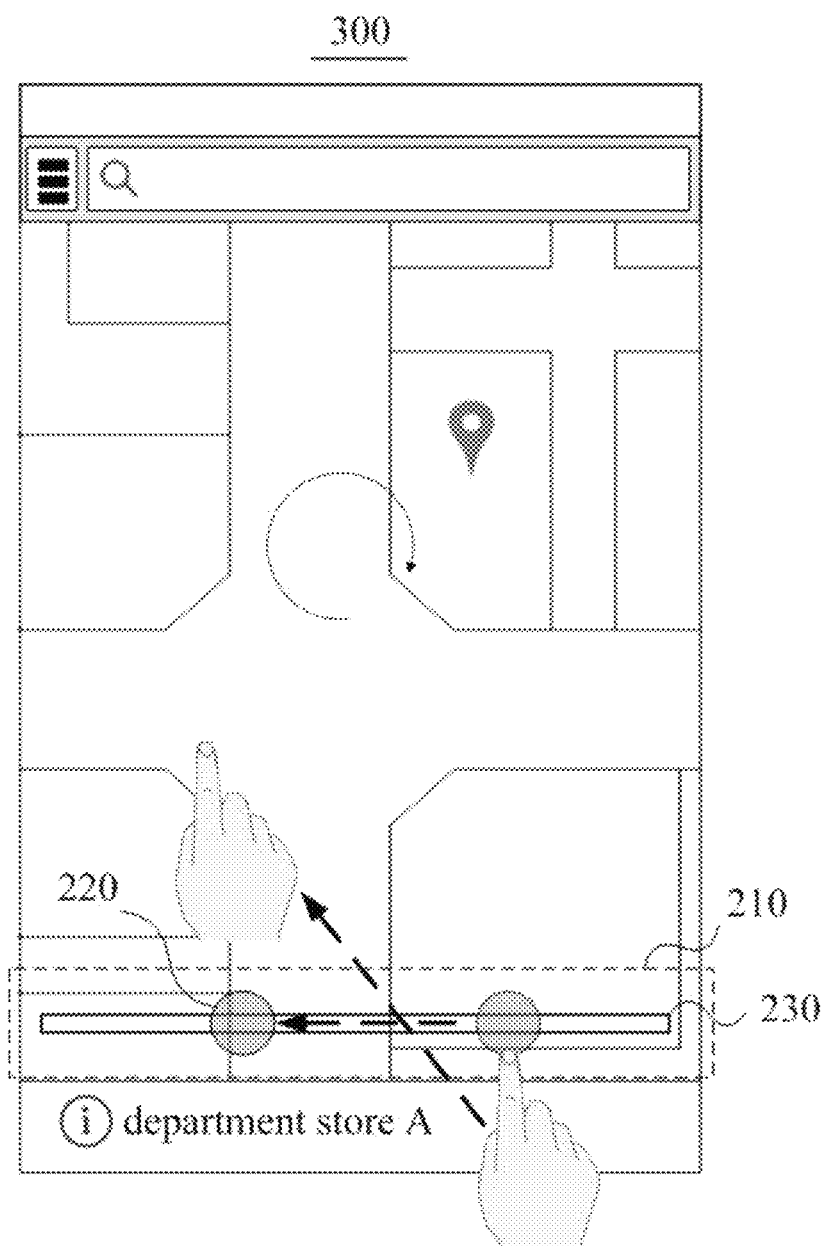
FIG. 3 illustrates a screen on which a pointer object moves based on a movement of a touch and map contents rotate according to an example embodiment.

FIG. 3 illustrates a screen on which a pointer object moves based on a movement of a touch and map contents rotate according to an example embodiment. A screen 300 displays an example in which a pointer object 220 moves as a touch moves in a state where the touch is maintained and map contents rotates. In this case, the pointer object 220 may move according to a variance of a first direction (or an opposite direction of the first direction, e.g., a transverse direction) according to a movement of the touch. In this case, a variance of a second direction (or an opposite direction of the second direction, e.g., a longitudinal direction) may be irrespective of the movement of the pointer object 220. Also, map contents may rotate relative to a Z axis (e.g., a vertical axis of a plane of a touch screen, as an axis for heading rotation of map contents) of a 3-dimensional (3D) coordinate system according to the variance of the first direction.

Also, although it is not shown on the screen 300, the variance of the second direction according to the movement of the touch may be used for rotating the map contents relative to an X axis (e.g., a horizontal axis of the plane of the touch screen, as an axis for tilt rotation or pitch rotation of the map contents). An angle of rotation according to the variance of the second direction may be limited within a predetermined (and/or alternatively, desired) angle range. An angle of rotation may be limited within a predetermined (and/or alternatively, desired) angle range of −90 degrees to 90 degrees, such as a range of 0 degrees to 70 degrees. In contrast, an angle of rotation according to the variance of the first direction may be preset to be able to perform rotation of 360 degrees.

In this case, the variance of the first direction and the variance of the second direction may be changed to a rotation angle by Equation 1 below.

$$\text{Heading} = \text{currentHeading} + \text{pixelToDp}(X2-X1) * \alpha$$

$$\text{Tilt/Pitch} = \text{currentTilt} + \text{pixelToDp}(Y2-Y1) * \alpha$$

where, "Heading" may denote a rotation angle (hereinafter, referred to as a 'heading rotation angle') relative to the Z axis on the 3D coordinate system. "Tilt/Pitch" may denote a rotation angle (hereinafter, referred to as a 'tilt rotation angle') relative to the X axis on the 3D coordinate system. Also, "currentHeading" may denote a current heading rotation angle and "currentTilt" may denote a current tilt rotation angle. "pixelToDp( )" may denote a function of changing a pixel variance to a density-independent pixels (DP) variance. (X1, Y1) may denote a coordinate of a touch before being changed on a touch screen and (X2, Y2) may denote a coordinate of a touch after being changed on the touch screen.

To provide a smooth rotation effect, a calculated heading rotation angle and a calculated tilt rotation angle are not immediately applied to a next frame. A rotation angle of map contents of a next frame may be determined using a third rotation angle calculated per frame according to an interpolation method to which a predetermined (and/or alternatively, desired) smoothing factor is applied.

For example, a heading rotation angle of a next frame may be calculated using an algorithm shown below.

```
a = toPositiveDegree(targetHeading); // Rolling such that a target heading
value has a value of 0 to 360 always
b = toPositiveDegree(currentHeading); // Rolling such that a current
heading value has a value of 0 to 360 always
s = getSignedDeltaDegree(b, a); // a difference value between a current
heading value and a target heading value
d = abs(s); // change a negative number to a positive number
if (s < 0 || s > 179){ // rotate in a closer direction to move from a current
heading value to a target heading value
d = −d
}
t = b + d;
a heading rotation angle of a next frame = smoothing factor * b + (1 −
smoothing factor) * t
``` where, "targetHeading" may denote a calculated heading rotation angle and "currentHeading" may denote a current heading rotation angle. "toPositiveDegree( )" may be a function for changing an angle value of −180 degrees to 180 degrees to a value of 0 degrees to 360 degrees. Also, "getSignedDeltaDegree( )" may be a function for obtaining a difference between two values. "abs( )" may be a function for obtaining an absolute value.

A smoothing factor may be preset to, for example, "0.8". Although a calculated heading rotation angle is continuously changed according to a movement of a touch, a heading rotation angle of a next frame may be continuously calculated by using the changed heading rotation angle as a value of "targetHeading".

As such, a user may rotate map contents with only his or her one finger. Also, the user may move the map contents through another region of a map region other than a predetermined (and/or alternatively, desired) region. In other words, there may be a user interface which may allow the user to move and rotate contents with only his or her one finger.

FIGS. 2 and 3 illustrate examples in which a predetermined (and/or alternatively, desired) region is set to a lower end of a map region. For example, a region among 24 density-independent pixels (dp) (48 pixels relative to extra high dots per inch (XHDPI)) from the bottom of the map region to an upper end of the map region may be preset to a region which may receive a touch to activate the pointer object 220 and the scroll bar object 230. However, the scope and spirit of inventive concepts may not be limited thereto. For example, a region may be preset to activate and display the pointer object 220 and the scroll bar object 230 on an upper end or a right or left region of the map region. When a right or left side of the map region is used, the scroll bar object 230 may be configured to guide the pointer object 220 to move up and down.

A controller (not shown) including the pointer object 220 and the scroll bar object 230 may be faded in at a time point when a touch is maintained and activated and may be faded out at a time point when a touch is released and inactivated. An alpha value may be adjusted and blending with a map background may be performed by a fade-in and fade-out effect. For example, the fade-in and fade-out effect may continue during a predetermined (and/or alternatively, desired) time (e.g., one second). The pointer object 220 may be transparently maintained on the scroll bar object 230. However, actual alpha blending has an effect (that is, an effect on a portion where the pointer object 220 is displayed on the scroll bar object 230 not to be displayed) on the scroll bar object 230 under a point to be penetrated, using a map background color.

Figure 4:
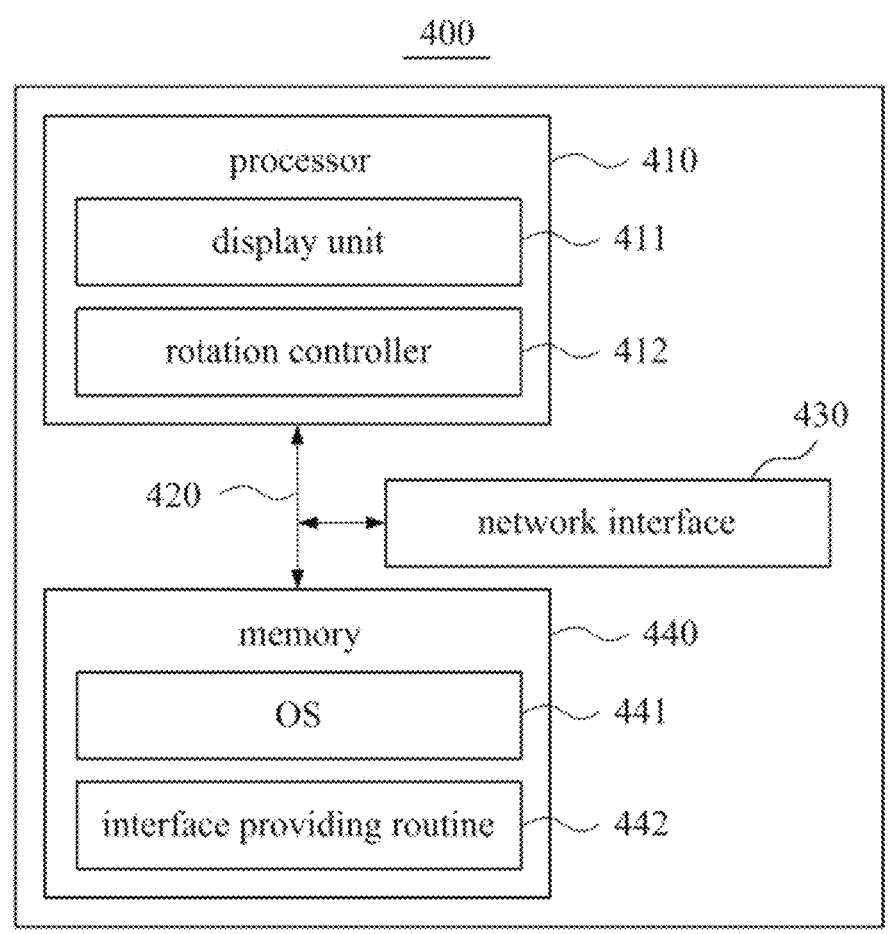
FIG. 4 is a block diagram illustrating a configuration of an interface providing system according to an example embodiment.
Figure 5:
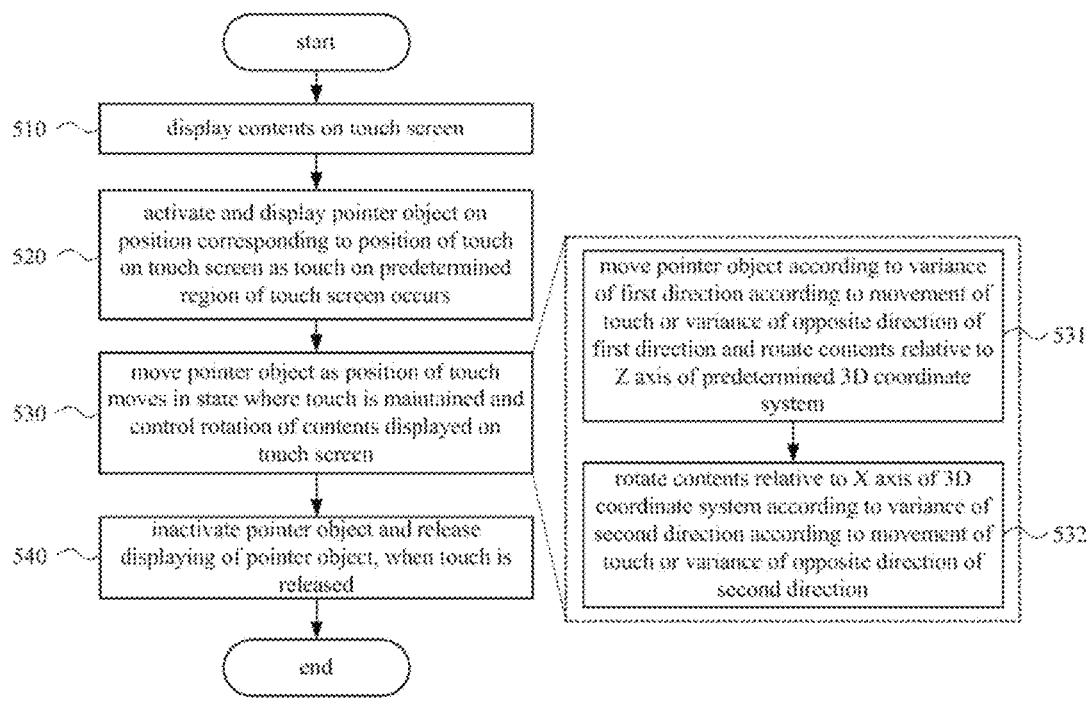
FIG. 5 is a flowchart illustrating an operation of an interface providing method according to an example embodiment.

FIG. 4 is a block diagram illustrating a configuration of an interface providing system according to an example embodiment. FIG. 5 is a flowchart illustrating an operation of an interface providing method according to an example embodiment.

An interface providing system 400 according to an example embodiment of inventive concepts may correspond to the user terminal described above. As shown in FIG. 4, the interface providing system 400 may include a processor 410, a bus 420, a network interface 430, and a memory 440. The memory 440 may include an operating system (OS) 441 and an interface providing routine 442. The processor 410 may include a display unit 411 and a rotation controller 412. In other example embodiments of inventive concepts, the interface providing system 400 may include more elements than that of FIG. 4. However, there is no need for clearly illustrating most conventional elements. For example, the interface providing system 400 may further include another element such as a display or touch screen and a transceiver.

The memory 440 may be a computer-readable medium (e.g., a non-transitory computer-readable medium) and may include permanent mass storage devices such as a random access memory (RAM), a read only memory (ROM), and a disc drive. Also, the memory 440 may store program codes (computer-readable instructions) for the OS 441 and the interface providing routine 442. These computer-readable instructions may be loaded from a computer-readable medium which is independent of the memory 440 using a drive mechanism (not shown). This computer-readable medium may include, but is not limited to, a floppy drive, a disc, a tape, a Digital Versatile Disc (DVD)/compact disc (CD)-ROM drive, and a memory card. In one example embodiment of inventive concepts, computer-readable instructions may be loaded into the memory 440 through the network interface 430 other than the computer-readable medium. For example, the interface providing routine 442 may be loaded into the memory 440 according to programs installed by files provided from developers through a network (via known and/or to be developed wired and/or wireless communication means and standards).

The bus 420 may facilitate communication and data transmission between elements (e.g., the processor 410 and the memory 440) of the interface providing system 400. The bus 420 may be configured using a high-speed serial bus, a parallel bus, a storage area network (SAN), and/or other proper communication technologies.

The network interface 430 may be a computer hardware element for connecting the interface providing system 400 to a computer network. The network interface 430 may connect the interface providing system 400 to a computer network through known and/or to be developed wireless and/or or wired connection means and standards.

The processor 410 may be configured to process instructions of a computer program by performing a basic arithmetic operation, a basic logic operation, and an input-output operation of the interface providing system 400. The instructions may be provided to the processor 410 through the bus 420 by the memory 440 or the network interface 430. The display unit 411 and the rotation controller 412 included in the processor 410 may be configured to execute program codes/computer-readable instructions. This program codes or the instructions may be stored in a recording device (e.g., the interface providing routine 442) such as the memory 440.

In this case, the processor 410 configured as the display unit 411 and the rotation controller 412 may be configured to perform steps 510, 520, 530, 531, 532, and 540 of FIG. 5. While FIG. 5 will be described below with reference to/from the perspective of the display unit 411 and/or the rotation controller 412, it is known to a person having ordinary skills in the art, that the same functionalities may be carried out by the processor 410 in FIG. 4, which includes the display unit 411 and the rotation controller 412.

The processor 410 may load program codes stored in at least one file of an application for the interface providing method to a memory (e.g., the memory 440). For example, the at least one file of the application may be provided from file distribution server through a network and be installed interface providing system 400. When the application is executed in interface providing system 400, the processor 410 may load the program codes (or instructions) from the at least one file to memory.

In step 510, the display unit 411 may display contents on a touch screen. The contents may include various contents such as map contents, photo contents, and image contents. The display unit 411 may display a plurality of contents once on its screen.

In step 520, the display unit 411 may activate and display a pointer object on a position corresponding to a position of a touch on the touch screen as the touch on a predetermined (and/or alternatively, desired) region of the touch screen occurs. In this case, the display unit 411 may further display a scroll bar object, for guiding a movement of the pointer object, on the predetermined (and/or alternatively, desired) region. The pointer object and the scroll bar object are described above with reference to FIGS. 2 and 3.

In step 530, the rotation controller 412 may move the pointer object as a position of a touch moves in a state where the touch is maintained and may control rotation of contents displayed on the touch screen.

According to an example embodiment of inventive concepts, step 530 may include steps 531 and 532.

In step 531, the rotation controller 412 may move the pointer object according to a variance of a first direction of movement of the touch or a variance of an opposite direction of the first direction and may rotate contents relative to a Z axis of a 3D coordinate system.

In step 532, the rotation controller 412 may rotate the contents relative to an X axis of the 3D coordinate system according to a variance of a second direction of movement of the touch or a variance of an opposite direction of the second direction. In this case, an angle of rotation according to the variance of the second direction may be limited within a predetermined (and/or alternatively, desired) angle range of −90 degrees to 90 degrees.

Also, the pointer object may move along an axis corresponding to the first direction. An axis corresponding to the first direction and an axis corresponding to the second direction may be configured to cross at right angles (i.e., may be perpendicular to one another).

For example, the rotation controller 412 may calculate an angle of rotation relative to an axis corresponding to a predetermined (and/or alternatively, desired) direction on a predetermined (and/or alternatively, desired) 3D coordinate system according to a value in which a pixel variance of the predetermined (and/or alternatively, desired) direction of movement of a touch is changed to a density-independent pixels (DP) variance and a predetermined (and/or alternatively, desired) weight value.

Also, when a current first rotation angle of contents is changed to a second rotation angle calculated according to a movement of a touch to be displayed, the rotation controller 412 may determine a rotation angle of contents of a next frame using a third rotation angle calculated per frame according to an interpolation method to which the first rotation angle, the second rotation angle, and a predetermined (and/or alternatively, desired) smoothing factor are applied.

In step 540, when the touch is released, the display unit 411 may inactivate the pointer object and may release the displaying of the pointer object. In this case, the display unit 411 may also inactivate the scroll bar object and may release the displaying of the scroll bar object.

As such, according to example embodiments of inventive concepts, the interface providing system may provide a user interface of a new type, which may rotate a screen through a pointer object controlled by a slide type. The interface providing system may control Z-axis rotation of contents according to a movement in a first direction (e.g., a transverse direction) of a touch in a state where a pointer object is activated and may control X-axis rotation of contents according to a movement in a second direction (e.g., a longitudinal direction) of the touch. Also, the interface providing system may provide a user interface for allowing a user to move and rotate contents with only his or her one finger. Because the rotation of the contents is available without multi-touch, the required amount of computation and data may be reduced.

The foregoing devices may be realized by hardware elements, software elements executed by hardware elements and/or combinations thereof. For example, the devices and components illustrated in example embodiments of inventive concepts may be implemented in one or more by one or more processing circuitry such as a processor, a controller, an arithmetic logic unit (ALU), a digital signal processor, a microcomputer, a field programmable array (FPA), a programmable logic unit (PLU), a microprocessor or any device which may execute instructions and respond. A processing circuitry may implement an operating system (OS) or one or more software applications running on the OS. Further, the processing circuitry may access, store, manipulate, process and generate data in response to execution of software (computer-readable instructions). It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing circuitry to operate in a desired manner or independently or collectively control the processing circuitry. Software and/or data may be permanently or temporarily embodied in any type of machine, components, physical equipment, virtual equipment, computer storage media or units or transmitted signal waves to be interpreted/executed by the processing circuitry or to provide instructions or data to the processing circuitry. Software may be dispersed throughout computer systems connected via networks and be stored or executed in a dispersion manner. Software and data may be recorded in one or more computer-readable storage media.

The methods according to the above-described example embodiments of inventive concepts may be implemented with program instructions which may be executed by various computer means (processing circuitry such as a processor) and may be recorded in computer-readable media. The computer-readable media may also include, alone or in combination with the program instructions, data files, data structures, and the like. The program instructions recorded in the media may be designed and configured specially for the example embodiments of inventive concepts. Computer-readable media may include, but is not limited to, magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like. Program instructions may include both machine codes, such as produced by a compiler, and higher-level language codes which may be executed by the computer using an interpreter. The described hardware devices may be configured as one or more modules/units to perform the operations of the above-described example embodiments of inventive concepts, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and/or equivalents to the claims presented herein are within the scope of the following claims.

What is claimed is:

1. An interface providing method in an interface providing system implemented with a computer including a touch screen, the method comprising:

displaying, by at least one processor, contents on the touch screen;

displaying, by the at least one processor,
  a pointer object at a position corresponding to a position of a touch on the touch screen, and
  a scroll bar object defining a first area of the touch screen;

moving, by the at least one processor, the pointer object within the first area of the touch screen as the position of the touch moves parallel to a first axis in a state where the touch is maintained;

controlling, by the at least one processor, a rotation of contents displayed on the touch screen, the rotation including,
  rotating the contents relative to a Z axis of a 3-dimensional (3D) coordinate system based on the moving the pointer object, and
  rotating the contents relative to an X axis of the 3D coordinate system according to movement of the touch parallel to a second axis, the first axis being perpendicular to the second axis, the moving the pointer object not being based on the movement of the touch parallel to the second axis; and terminating, by the at least one processor, the displaying the pointer object when the touch is terminated.

2. The method of claim 1, wherein
the scroll bar object is configured to guide a movement of the pointer object,
the moving moves the pointer object along the scroll bar object, and
the terminating includes further terminating the displaying the scroll bar object when the touch is terminated.

3. The method of claim 1, wherein the rotating the contents relative to the X axis is limited to an angle range of −90 degrees to 90 degrees.

4. The method of claim 1, wherein the controlling the rotation of the contents displayed on the touch screen includes
  calculating an angle of rotation relative to an axis of a 3-dimensional (3D) coordinate system according to a value in which a pixel variance of a direction of movement of the touch is changed to a density-independent pixels (DP) variance and a weight value.

5. The method of claim 1, wherein the controlling the rotation of the contents displayed on the touch screen includes
  determining a rotation angle of the contents in a next frame using a third rotation angle when a current first rotation angle of the contents is changed to a second rotation angle calculated according to a movement of the touch to display the contents, the third rotation angle being calculated per frame according to an interpolation method to which the current first rotation angle, the second rotation angle, and a smoothing factor are applied.

6. The method of claim 1, wherein the contents include a map screen provided by a map service.

7. A non-transitory computer-readable medium storing computer-readable instructions, which when executed by at least one processor, cause the at least one processor to perform the method of claim 1.

8. The method of claim 1, wherein the touch is a singular touch.

9. The method of claim 1, wherein the Z axis is perpendicular to the touch screen and the first axis is perpendicular to the Z axis.

10. The method of claim 1, wherein the moving the pointer object moves a position of the pointer object across the touch screen according to the movement of the position of the touch.

11. The method of claim 1, wherein the displaying the pointer object displays the pointer object proximate to a set periphery of the touch screen.

12. An interface providing system implemented with a computer including a touch screen, the system comprising:
  a memory having computer-readable instructions stored therein; and
  at least one processor configured to execute the computer-readable instructions to,
    display contents on the touch screen,
    display,
      a pointer object at a position corresponding to a position of a touch on the touch screen, and
      a scroll bar object defining a first area of the touch screen,
    move the pointer object within the first area of the touch screen as the position of the touch moves parallel to a first axis in a state where the touch is maintained,
    control a rotation of contents displayed on the touch screen, the rotation including,
      rotating the contents relative to a Z axis of a 3D coordinate system based on the movement of the pointer object, and
      rotating the contents relative to an X axis of the 3D coordinate system according to movement of the touch parallel to a second axis, the first axis being perpendicular to the second axis, the movement of the pointer object not being based on the movement of the touch parallel to the second axis, and
    terminate the displaying of the pointer object when the touch is terminated.

13. The system of claim 12, wherein the scroll bar object is configured to guide a movement of the pointer object, and
the movement moves the pointer object along the scroll bar object.

14. The system of claim 12, wherein the at least one processor is further configured to calculate an angle of rotation relative to an axis of a 3-dimensional (3D) coordinate system according to a value in which a pixel variance of a movement of the touch is changed to a density-independent pixels (DP) variance and a weight value.

15. The system of claim 12, wherein the at least one processor is further configured to determine a rotation angle of the contents in a next frame using a third rotation angle when a current first rotation angle of the contents is changed to a second rotation angle calculated according to a movement of the touch to display the contents, the third rotation angle being calculated per frame according to an interpolation method to which the current first rotation angle, the second rotation angle, and a smoothing factor are applied.

16. The system of claim 12, wherein the contents include a map screen for a map service.

* * * * *